(12) United States Patent  (10) Patent No.: US 12,304,142 B2
Blackwell et al.  (45) Date of Patent: May 20, 2025

(54) 3D PRINTED SLEEVE AND A METHOD FOR PREPARING THEREOF

(71) Applicant: Suominen Oyj, Helsinki (FI)

(72) Inventors: Charlie Blackwell, St. Paul, MN (US); Justin Boncher, Green Bay, WI (US); Gian Luca Polosa, Varese (IT); Tero Haaparanta, Nakkila (FI); Markku Koivisto, Kauniainen (FI)

(73) Assignee: SUOMINEN OYJ, Helsinki (FI)

( * ) Notice: Subject to any disclaimer, the term of this patent is extended or adjusted under 35 U.S.C. 154(b) by 731 days.

(21) Appl. No.: 17/262,799

(22) PCT Filed: Mar. 25, 2019

(86) PCT No.: PCT/FI2019/050245
§ 371 (c)(1),
(2) Date: Jan. 25, 2021

(87) PCT Pub. No.: WO2020/021158
PCT Pub. Date: Jan. 30, 2020

(65) Prior Publication Data
US 2021/0229345 A1    Jul. 29, 2021

Related U.S. Application Data

(60) Provisional application No. 62/702,921, filed on Jul. 25, 2018.

(51) Int. Cl.
*B29C 64/124* (2017.01)
*B29C 59/04* (2006.01)
(Continued)

(52) U.S. Cl.
CPC ............ *B29C 64/124* (2017.08); *B29C 59/04* (2013.01); *B29C 64/30* (2017.08); *B33Y 10/00* (2014.12);
(Continued)

(58) Field of Classification Search
CPC ....... B29C 64/124; B29C 64/30; B33Y 40/20; D04H 1/495; D04H 1/76; D04H 3/07; D04H 18/04; D04H 1/492; B31F 1/07
See application file for complete search history.

(56) References Cited

U.S. PATENT DOCUMENTS 4,383,495 A * 5/1983 Plichta ................ H05K 3/4053
118/406
5,098,764 A    3/1992 Drelich et al.
(Continued)

FOREIGN PATENT DOCUMENTS

CN         1331265 A     1/2002
CN      101588916 A    11/2009
(Continued)

*Primary Examiner* — Seyed Masoud Malekzadeh
*Assistant Examiner* — Vipul Malik
(74) *Attorney, Agent, or Firm* — Timothy H. Van Dyke; Wolter Van Dyke Davis, PLLC

(57) ABSTRACT

The invention relates to a manufacturing process of equipment for use in the production of nonwoven fabrics and paper products. According to the present invention, a sleeve for an embossing roller is produced using additive manufacturing, specifically 3D printing. These technologies permit the preparation of pattern-forming and dewatering details in the sleeve in a single operation. The dewatering properties may thus be optimised for the selected pattern, resulting in uniform dewatering tailored for the pattern. Preferably, the technique used is stereolitography.

10 Claims, 1 Drawing Sheet

(51) Int. Cl.
*B29C 64/30* (2017.01)
*B33Y 10/00* (2015.01)
*B33Y 40/20* (2020.01)
*B33Y 80/00* (2015.01)
*D04H 1/495* (2012.01)
*D04H 1/76* (2012.01)
*D04H 3/07* (2012.01)
*D04H 18/04* (2012.01)

(52) U.S. Cl.
CPC .............. *B33Y 40/20* (2020.01); *B33Y 80/00* (2014.12); *D04H 1/495* (2013.01); *D04H 1/76* (2013.01); *D04H 3/07* (2013.01); *D04H 18/04* (2013.01)

(56) References Cited

U.S. PATENT DOCUMENTS

| | | | |
|---|---|---|---|
| RE38,505 E | | 4/2004 | James et al. |
| 2005/0280184 A1 | | 12/2005 | Sayers et al. |
| 2006/0022379 A1 | * | 2/2006 | Wicker ................. B33Y 70/00 |
| | | | 264/401 |
| 2006/0267245 A1 | | 11/2006 | Halbeisen et al. |
| 2010/0239814 A1 | | 9/2010 | Mourad et al. |
| 2011/0195266 A1 | * | 8/2011 | Spoto ................... B44B 5/0052 |
| | | | 428/161 |
| 2012/0021171 A1 | | 1/2012 | Riviere et al. |
| 2014/0121626 A1 | * | 5/2014 | Finn ......................... B32B 5/06 |
| | | | 156/196 |
| 2015/0102526 A1 | | 4/2015 | Ward et al. |
| 2016/0159007 A1 | | 6/2016 | Miller, IV et al. |
| 2016/0354979 A1 | | 12/2016 | Manifold et al. |
| 2018/0073195 A1 | * | 3/2018 | Sealey .................... D21F 5/182 |
| 2018/0119351 A1 | * | 5/2018 | Brent, Jr. ............... B33Y 80/00 |
| 2018/0133953 A1 | * | 5/2018 | Achten .............. C08G 18/8175 |
| 2018/0169995 A1 | | 6/2018 | Zajaczkowski et al. |

FOREIGN PATENT DOCUMENTS

| | | | | |
|---|---|---|---|---|
| CN | 107405802 A | | 11/2017 | |
| CN | 107531085 A | | 1/2018 | |
| DE | 202004011022 U1 | | 9/2004 | |
| DE | 102013010160 A1 | | 1/2015 | |
| EP | 2392713 A1 | | 12/2011 | |
| EP | 2674505 A2 | | 12/2013 | |
| EP | 2685000 A1 | | 1/2014 | |
| EP | 3282045 A1 | | 2/2018 | |
| WO | WO2010013281 A1 | | 2/2010 | |
| WO | WO2011097483 A1 | | 8/2011 | |
| WO | WO-2013037525 A1 | * | 3/2013 | ............. D21F 3/083 |
| WO | WO-2015000642 A1 | * | 1/2015 | ............. D21F 3/08 |
| WO | WO2016085704 A1 | | 6/2016 | |
| WO | WO2016090364 A1 | | 6/2016 | |

* cited by examiner

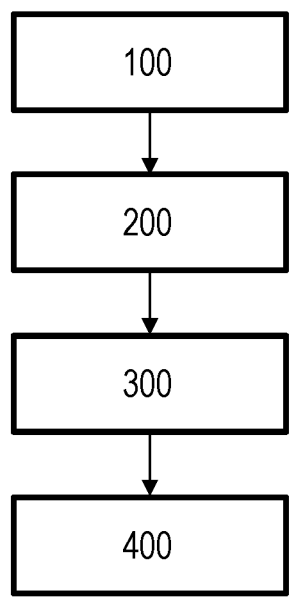

3D PRINTED SLEEVE AND A METHOD FOR PREPARING THEREOF

FIELD OF THE INVENTION

The invention relates to a manufacturing process of equipment for use in the production of nonwoven fabrics and paper products. More specifically, the invention relates to a manufacturing process for embossing sleeves and to a sleeve manufactured according to the process. Further, the invention relates to a nonwoven fabric produced using said sleeve, and the use of such nonwoven fabric.

BACKGROUND

The surface structure of various webs, e.g. tissue paper and nonwoven fabrics, may be modified during production to obtain a pattern of raised or compressed portions. The obtained pattern may also include apertures in the web. The patterning can be done both for aesthetic reasons and in order to provide desired technical characteristics in the product. The process of imposing patterns on a web is often referred to as embossing.

The pattern may be imposed by a number of methods, involving wires or rolls having protrusions, valleys and orifices corresponding to the pattern which is to be imprinted on the web surface. Heat and pressure may be used. In the production of nonwoven fabric, hydroentangling is a widely employed method in which arrays of nozzles are arranged perpendicularly to the web in order to direct distinct sprays of water against the moving web surface. The force of the water sprays mix and entangle the fibers of which the web is constituted, and thus bonding of the web is achieved. Simultaneously, if the roll or wire surface carrying the moving web has a pattern, a corresponding pattern is formed in the web.

In order to vary the patterns, a number of rolls or wires having the corresponding structure must be kept available.

In the case of rollers they must be discarded or refurbished when their surface structure wears out. A solution to this problem has been to replace monolithic embossing rollers with rotatable support structures to which replaceable sleeves are torsionally coupled. This approach is commonly used in the field of printing, but the field of embossing presents different technical challenges. In WO 2010/013281, a system with exchangeable sleeves for embossing rollers is disclosed, designed to cope with the compression stresses occurring in the production of embossed tissue paper. This solution employs in the sleeve a layered structure having an outermost engraved metallic layer overlying one or more layers of fiber-reinforced synthetic resin.

In US Reissue 38505 is disclosed a hydroentangled nonwoven fabric having a three-dimensional structure, the objective being the production of nonwovens having an appearance and properties resembling woven fabrics. The nonwoven fabric is manufactured using a support member in the form of a belt or a drum, the surface pattern of which is produced by means of laser ablation. The precursors for the laser ablation operation are disclosed in e.g. U.S. Pat. No. 5,098,764. These precursors are provided with a predetermined array of dewatering openings and a basic topography, and the final surface structure is prepared using laser technology.

Additive manufacturing is a term used for describing a set of technologies for creating three-dimensional objects by successive addition of material layers. A type of additive manufacturing that is gaining considerable attention and popularity is 3D printing, of which in turn a number of varieties exist.

US patent application publication No. 2016/0159007 discloses a manufacturing process for a belt for tissue paper production using 3D printing technology. FDM or PolyJet technology is employed to produce a belt comprising a pocket zone for imposing the desired pattern to the web, and a vacuum breaking zone for preventing or limiting the amount of fibers pulled through the pocket zone.

Stereolitography is a 3D printing technology for the production of objects by a layer-by layer process using photopolymerisation. A light-emitting device under computer control selectively illuminates portions within a container containing a photopolymerising resin, causing small amounts of resin to cure and adhere to sections of the object being manufactured. In the preferable inverted stereolitography process, the manufactured object is progressively lifted out of the resin bath, with successive layers of hardened resin being added to the underside of the object. In the non-inverted version, the object is formed within the resin bath by adding material to its top, which requires a volume of uncured resin corresponding to the size of the product.

Other 3D printing methods include Digital Light Processing (DLP), Fused Deposition Modelling (FDM), Selective Laser Sintering (SLS), Selective Laser Melting (SLM), Electron Beam Melting (EBM) and Laminated Object Manufacturing (LOM).

SUMMARY OF THE INVENTION

According to the present invention, a sleeve for an embossing roller is produced using 3D printing. Preferably, the technique used is stereolitography. These technologies permit the preparation of pattern-forming and dewatering details in the sleeve in a single operation. The dewatering properties may thus be optimised for the selected pattern, resulting in uniform dewatering tailored for the pattern.

The use of 3D printing technology brings the full benefits of CAD to sleeve design. The technology allows for great variation in the structure, i.e. variation of the pattern along all directions of the sleeve surface. Since the design is fully transferable and scalable, the preparation of both prototype and production scale sleeves may be significantly faster than when using prior art methods for making metal sleeves. A further advantage is the possibility of repair. Since all structural details are stored digitally, an exact replacement part for any damaged area may be prepared on demand.

BRIEF DESCRIPTION OF THE DRAWING

The invention is explained in the following description and in view of the lone drawing that shows an example embodiment of an additive manufacturing process for producing a cylindrical sleeve for forming, pressing, or molding a fibrous web.

Preferably, the sleeve according to the invention is designed for hydroentangling a web of fibers, whereby the fibers may be of any type suitable for producing a web by hydroentangling.

DETAILED DESCRIPTION

The invention is defined in the independent claims. Preferable embodiments are set out in the dependent claims.

Preferably, the material for the sleeve according to the invention is photocurable resin. Examples of such resins are epoxides, urethanes, polyethers and polyesters.

In a process using stereolitography, the cylindrical sleeve may be manufactured beginning from one end of the cylinder, the cylinder being lifted successively out of the resin container. The sleeve diameter is thus limited only by the size of the resin container, and the length of the sleeve, i.e. the width of the resultant web, is limited by the maximum lifting height of the stereolitography equipment.

A further advantage when stereolitography is used is the flexibility in designing not only the location and distribution but also the shape of dewatering holes.

For the manufacturing of a dewatering embossing sleeve, all refinements and variations known in the field of stereolitography may be used, e.g. supporting components that are dissolved or otherwise removed from the printed product.

The need for supporting structures typically increases as dimensions increase. External supporting structures are preferred to internal ones, since removal of external material is considerably less risky than the removal of material inside a sleeve structure.

In the production of an embossing sleeve using stereolitography, attention must be given to the water absorption properties of the material. The water absorption must be kept as a maximum of 2% by weight, preferably no more than 1,5%, more preferably no more than 1%, more preferably no more than 0.5%, more preferably no more than 0.2%. If the water absorption is excessive, material properties such as strength and flexibility may change. Moreover, the dimensions of the sleeve may change with rising water absorption, which is reflected in difficulties in fitting the sleeve to production equipment and securing it during use. If dimensions change, the sleeve no longer fits snugly to the supporting structure. This slack in combination with fast rotation will quickly cause fatal damage.

The strength of the sleeve must be sufficient to withstand the stresses caused by rotational forces and the pressure differences due to external water pressure and reduced internal pressure for water removal. Further, the structural integrity of the sleeve must be carefully preserved during storage and transport, and this is reflected in the strength requirements.

The thickness of a sleeve according to the invention is preferably at least 5 mm, more preferably at least 6 mm, as measured from the level of the lowermost points on the undersurface to the level of the uppermost points on the upper surface.

The depth of the patterning in a sleeve according to the invention affects the pattern quality but also the strength of the sleeve. Preferably, the depth of the pattern as defined by the distance between the lowermost level in the pattern (excluding openings) to the uppermost points of the upper surface is in the range 10% to 50%, more preferably in the range 15 to 30% of the thickness of the sleeve as defined above.

The measurement of thickness and pattern depth may be carried out using e.g. structured-light 3D-scanning.

Preferably, a sleeve manufactured according to the invention should satisfy the following conditions:
- Tensile strength at least 55 MPa, preferably at least 56, preferably at least 57
- Elongation at break max 20%, preferably max 15%, preferably max 10%
- Flexural strength at least 82 MPa, preferably at least 87 MPa, preferably at least 93 MPa
- Flexural modulus at least 2400 MPa, preferably at least 2700 MPa, preferably at least 3100 MPa
- Izod notched impact at least 0.4 ft-lb/in, preferably at least 0.55 ft-lb/in, preferably at least 0.7 ft-lb/in
- Shore D hardness at least 80, preferably at least 84, preferably at least 87

Sharp edges in the sleeve surface may cause sticking of fibers, leading to linting tendencies in the product. Thus, maximum smoothness and avoidance of any surface damage are of great importance. These requirements underline the importance of correct material choices. The surface of a 3D-printed sleeve may receive a coating finish or sealant using high quality cross-linked resins such as cyanoacrylates, Dichtol products of the Diamant® company, Mönchengladbach, Germany or Nanoseal products of the medacom company, Butzbach, Germany. Such resins may be applied e.g. by spraying or immersing, and cured by appropriate means for the resin used, as known by a person skilled in polymer chemistry.

During the finishing coating, care must be taken to provide surface coverage also in the dewatering openings, thereby also achieving the correct dimensions for those openings. Vacuum may advantageously be used for distributing the finishing coating evenly over the structure surface.

A need for specified technical design of nonwoven webs exists e.g. in layered products like diapers, sanitary pads and the like. These comprise layers having particular tasks within the structure, such as allowing a liquid to enter the structure (topsheet), for dispersing the liquid (ADL), absorbing it and preventing the liquid from escaping (backsheet). Thus, a sleeve according to the invention may be used for producing e.g. topsheets, ADL and backsheets for layered products. Further examples of applications for products prepared using a sleeve according to the invention are nonwovens used in wallpaper, upholstery, carpeting, geotextiles, filters labels, laundry aids; and wipes for use in household, medical (including sterile products), workplace and personal hygiene applications.

As illustrated in the FIGURE, in an example embodiment, an additive manufacturing process for producing a cylindrical sleeve for forming, pressing, or molding a fibrous web comprises: 100 providing a resin bath of a photocurable resin; and 200 repeatedly illuminating portions of the photocurable resin within the resin bath to cure the photocurable resin and form the cylindrical sleeve for forming, pressing, or molding a fibrous web on a layer-by-layer basis. Successive layers of the cured resin are built up on an underside or a topside of previously formed layers. The method may further include 300 forming pattern-forming details and dewatering holes in the cylindrical sleeve when forming the cylindrical sleeve on the layer-by-layer basis. The method may further include 400 applying a coating comprising a cross-linked resin to a radially outward facing external surface of the cylindrical sleeve and in the dewatering holes and curing the cross-linked resin.

The invention claimed is:

1. A method for preparing a cylindrical sleeve for a drum for forming, pressing, or molding a fibrous web, wherein the method comprises:
   forming the cylindrical sleeve comprising pattern-forming details and dewatering holes therein by additive manufacturing, wherein the pattern-forming details comprise valleys in a radially outward facing external surface of the cylindrical sleeve;
   applying a coating comprising a cross-linked resin to the radially outward facing external surface of the cylindrical sleeve and in the dewatering holes;

using a vacuum to distribute the coating evenly in the dewatering holes to achieve predetermined dimensions in the dewatering holes;

and curing the cross-linked resin.

2. The method according to claim 1, wherein the cylindrical sleeve is formed using stereolithography.

3. An additive manufacturing process for producing a cylindrical sleeve for forming, pressing, or molding a fibrous web, the additive manufacturing process comprising:

providing a resin bath of a photocurable resin;

repeatedly illuminating portions of the photocurable resin within the resin bath to cure the photocurable resin and form the cylindrical sleeve for forming, pressing, or molding a fibrous web on a layer-by-layer basis, wherein successive layers of cured resin are built up on an underside or a topside of previously formed layers;

forming pattern-forming details and dewatering holes in the cylindrical sleeve when forming the cylindrical sleeve on the layer-by-layer basis;

applying a coating comprising a cross-linked resin to a radially outward facing external surface of the cylindrical sleeve and in the dewatering holes;

using a vacuum to distribute the coating evenly in the dewatering holes to achieve predetermined dimensions in the dewatering holes;

and curing the cross-linked resin.

4. The additive manufacturing process of claim 3, wherein the photocurable resin is selected from a group consisting of epoxides, urethanes, polyethers, and polyesters.

5. The additive manufacturing process of claim 3, further comprising hydro-embossing a pattern on a nonwoven fibrous web using the cylindrical sleeve.

6. The additive manufacturing process of claim 3, further comprising ensuring a water absorption capacity of the cylindrical sleeve is no more than 2% by weight.

7. The additive manufacturing process of claim 3, wherein the cylindrical sleeve is configured to comprise a flexural modulus of at least 2400 MPa and a thickness of at least five (5) millimeters.

8. The method according to claim 1, further comprising distributing the coating evenly over an outer surface of the cylindrical sleeve comprising the radially outward facing external surface and surface in the dewatering holes.

9. The method according to claim 8, further comprising using the vacuum to distribute the coating evenly over the outer surface.

10. The additive manufacturing process of claim 3, wherein the successive layers of the cured resin are built up on the underside of the previously formed layers.

* * * * *